Patented May 31, 1932

1,860,542

UNITED STATES PATENT OFFICE

BERNARD HERSTEIN, OF BROOKLYN, NEW YORK, ASSIGNOR TO U. S. INDUSTRIAL ALCOHOL CO., OF NEW YORK, N. Y., A CORPORATION OF WEST VIRGINIA

MANUFACTURE OF ACETIC ANHYDRIDE

No Drawing.   Application filed May 28, 1930.   Serial No. 456,797.

The invention relates to a process for manufacturing acetic anhydride or other organic-acid anhydrides, utilizing the reaction between sulfuryl chlorid and an anhydrous salt of the organic acid, e. g. sodium acetate.

The standard practice of manufacturing acetic anhydride by the sulfuryl chlorid process is to suspend sodium acetate in acetic anhydride and to add either preformed sulfuryl chlorid or the component gases ($SO_2$ and $Cl_2$), in which latter case the reagent is prepared in situ. With this method, it is necessary to put back into the process large quantities of the expensive acetic anhydride, with concomitant losses, and at the end of the reaction there is left in the reaction vessel a thick mass or paste of very finely divided sodium chlorid and sodium sulfate suspended in acetic anhydride. In order to obtain the acetic anhydride formed by the reaction and also to recover the anhydride employed as the medium in which the reaction takes place, the whole reaction mass is subjected to vacuum distillation, using a temperature in certain cases up to 250° C. The apparatus and equipment requirements are therefore heavy, and the handling of the paste and the residual salts is difficult. A more economic method for making acetic anhydride has been recognized as a great necessity.

In my invention the anhydrous sodium acetate or other suitable salt of acetic acid, for example calcium acetate, is suspended in liquid sulfur dioxide as the reaction medium and is reacted with sulfuryl chlorid, either preformed or in the form of its components, namely, sulfur dioxide and chlorine, the sulfuryl chlorid or its components being added in measurably stoichiometrical proportions. The reaction mixture is cooled (0° C.-20° C.) and the contents are slowly stirred until completion of the reaction, which proceeds in accordance with the following chemical equation:

$4NaOAc + SO_2 + Cl_2 =$
$$2Ac_2O + Na_2SO_4 + 2NaCl.$$

For a given amount of the anhydrous sodium acetate about two to four times its weight of liquid sulfur dioxid is thus employed. The sodium acetate is placed in a gas-tight vessel into which the liquid sulfur dioxid is introduced through a valved pipe. Cooled sulfuryl chlorid or its components are then admitted through the pipe in amount sufficient to react with all of the sodium acetate. The mixture is stirred by a mechanical stirrer with which the vessel is provided, and the temperature is controlled so as to keep it within a range substantially as indicated.

An incidental advantage of my method is that the sodium sulfate and sodium chlorid produced as a result of the reaction are in the form of relatively large particles, distinct and separate. The reaction products can, therefore, be filtered, if desired, through a suitable filter, and the residual salts washed with fresh sulfur dioxid, thus obtaining a solution of acetic anhydride in sulfur dioxid, leaving behind the solid inorganic material. The filtrate may be disposed in another tight vessel, to which the contents of the reaction vessel can be transferred on the opening of a valve.

The filtrate thus obtained may be used directly for acetylating cellulose or for any other purpose for which the solution may be employed. Otherwise it is fractionated for $SO_2$ recovery and the production of acetic anhydride as an end product, this separation being easily effected.

However, instead of filtering the contents of the reaction vessel after the completion of the reaction, the sulfur dioxid and the acetic anhydride may be distilled off from the residual salts. The cost of recovery in this manner would be less than in the usual process in which a large quantity of added acetic anhydride must be evaporated as well as the anhydride which is formed.

Instead of adding sulfuryl chlorid as such to react with the sodium acetate suspended in liquid sulfur dioxid, an equivalent procedure is to introduce chlorine, either liquid or gaseous. In that case the amount of liquid sulfur dioxid present must be sufficient to provide about two to four parts by weight of liquid sulfur dioxid medium to each part by weight of sodium acetate, as well as the proper quantity of $SO_2$ (one mole-part of $SO_2$ for each mole-part of chlorine) for the reaction.

In either case, the amount of liquid sulfur dioxid constituting the medium should be such as to keep the mass fairly thin and in readily movable form, to facilitate the reaction by affording more immediate contacts between the reacting materials.

Obviously the reaction will proceed also along the lines indicated if in addition to liquid sulfur dioxid other inert media are present, for instance added acetic anhydride, hydrocarbons, etc. In any event, of course, the acetic anhydride which is formed as the reaction proceeds becomes part of the liquid contents of the vessel, and it is within the scope of my invention if some acetic anhydride or other supplementary media are introduced in addition to, or in place of part of, the liquid sulfur dioxid medium.

Among the advantages of the invention are the use of a very cheap reaction medium, the lessened cost involved in the evaporation of sulfur dioxid in the recovery of acetic anhydride, the elimination of a costly and cumbersome vacuum distillation, the filterability of the solution, and the possibility of using this solution without fractionation for certain purposes.

The method is applicable to the preparation of anhydrides of other organic acids, merely substituting appropriate alkali or alkaline earth salts of the corresponding organic acids. Thus to obtain propionic anhydride, sodium propionate may be substituted for sodium acetate in the reaction, to obtain butyric anhydride sodium butyrate may be employed, for benzoic anhydride use sodium benzoate, etc.

The alkali or other salts of the organic acids used should be as nearly anhydrous as possible, because any water present in the reaction mixture will unavoidably and to the extent of its presence reduce the yield by combining with the acid anhydride.

In the accompanying claims the expression "sulfuryl chlorid or its components" is to be understood as meaning sulfuryl chlorid or its equivalents, namely sulfur dioxid and chlorine reacting mol for mol.

I claim:

1. A process for the preparation of the anhydride of a lower fatty acid from a salt of the corresponding acid, which comprises reacting the salt with sulfuryl chlorid or its components in liquid sulfur dioxid as the reaction medium.

2. A process for the preparation of the anhydride of a lower fatty acid from a salt of the corresponding acid, which comprises reacting the salt with sulfuryl chlorid or its components in liquid sulfur dioxid and other inert liquids as the reaction medium.

3. A process for the preparation of acetic anhydride, which comprises mixing sodium acetate with two to four times its weight of liquid sulfur dioxid as a reaction medium, and causing sulfuryl chlorid or its components to react with the salt, while cooling and stirring the mass.

4. A process for the preparation of the anhydride of a lower fatty acid from a salt of the corresponding acid, which comprises suspending said salt in liquid sulfur dioxid and causing sulfuryl chlorid or its components to react with the salt, and separating the solution of the anhydride in liquid sulfur dioxid from the residue by filtration.

5. A process for the preparation of the anhydride of a lower fatty acid from a salt of the corresponding acid, which comprises suspending said salt in liquid sulfur dioxid and causing sulfuryl chlorid or its components to react with the salt, thereby obtaining an inorganic residue which is filterable, separating the solution of the anhydride in liquid sulfur dioxid from the residue by filtration, and fractionating the solution to recover $SO_2$ and to obtain the anhydride as an end product.

BERNARD HERSTEIN.